United States Patent
Ziv et al.

(10) Patent No.: US 11,776,547 B2
(45) Date of Patent: *Oct. 3, 2023

(54) SYSTEM AND METHOD OF VIDEO CAPTURE AND SEARCH OPTIMIZATION FOR CREATING AN ACOUSTIC VOICEPRINT

(71) Applicant: VERINT SYSTEMS INC., Melville, NY (US)

(72) Inventors: Omer Ziv, Ramat Gan (IL); Ran Achituv, Hod Hasharon (IL); Ido Shapira, Tel Aviv (IL); Jeremie Dreyfuss, Tel Aviv (IL)

(73) Assignee: Verint Systems Inc., Melville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/577,238

(22) Filed: Jan. 17, 2022

(65) Prior Publication Data

US 2022/0139399 A1 May 5, 2022

Related U.S. Application Data

(63) Continuation of application No. 16/848,385, filed on Apr. 14, 2020, now Pat. No. 11,227,603, which is a (Continued)

(51) Int. Cl.
G10L 17/00 (2013.01)
G10L 17/02 (2013.01)

(52) U.S. Cl.
CPC .............. *G10L 17/00* (2013.01); *G10L 17/02* (2013.01)

(58) Field of Classification Search
CPC .......... G10L 15/26; G10L 17/00; G10L 17/02
See application file for complete search history.

(56) References Cited

U.S. PATENT DOCUMENTS

| 4,653,097 A | 3/1987 | Watanabe et al. |
| 4,864,566 A | 9/1989 | Chauveau |

(Continued)

FOREIGN PATENT DOCUMENTS

| EP | 0598469 | 5/1994 |
| JP | 2004193942 | 7/2004 |

(Continued)

OTHER PUBLICATIONS

Baum, L.E., et al., "A Maximization Technique Occurring in the Statistical Analysis of Probabilistic Functions of Markov Chains," The Annals of Mathematical Statistics, vol. 41, No. 1, 1970, pp. 164-171.

(Continued)

*Primary Examiner* — Michael N Opsasnick
(74) *Attorney, Agent, or Firm* — Christopher M. Scherer; Erin Ella Block; DeWitt LLP

(57) ABSTRACT

Systems and method of diarization of audio files use an acoustic voiceprint model. A plurality of audio files are analyzed to arrive at an acoustic voiceprint model associated to an identified speaker. Metadata associate with an audio file is used to select an acoustic voiceprint model. The selected acoustic voiceprint model is applied in a diarization to identify audio data of the identified speaker.

20 Claims, 3 Drawing Sheets

Related U.S. Application Data continuation of application No. 16/594,812, filed on Oct. 7, 2019, now Pat. No. 10,650,826, which is a continuation of application No. 16/170,306, filed on Oct. 25, 2018, now Pat. No. 10,438,592, which is a continuation of application No. 14/084,974, filed on Nov. 20, 2013, now Pat. No. 10,134,400.

(60) Provisional application No. 61/729,064, filed on Nov. 21, 2012, provisional application No. 61/729,067, filed on Nov. 21, 2012.

(56) References Cited

U.S. PATENT DOCUMENTS

| | | | |
|---|---|---|---|
| 5,027,407 | A | 6/1991 | Tsunoda |
| 5,222,147 | A | 6/1993 | Koyama |
| 5,638,430 | A | 6/1997 | Hogan et al. |
| 5,805,674 | A | 9/1998 | Anderson |
| 5,907,602 | A | 5/1999 | Peel et al. |
| 5,946,654 | A | 8/1999 | Newman et al. |
| 5,963,908 | A | 10/1999 | Chadha |
| 5,999,525 | A | 12/1999 | Krishnaswamy et al. |
| 6,044,382 | A | 3/2000 | Martino |
| 6,145,083 | A | 11/2000 | Shaffer et al. |
| 6,266,640 | B1 | 7/2001 | Fromm |
| 6,275,806 | B1 | 8/2001 | Pertrushin |
| 6,427,137 | B2 | 7/2002 | Petrushin |
| 6,480,825 | B1 | 11/2002 | Sharma et al. |
| 6,510,415 | B1 | 1/2003 | Talmor et al. |
| 6,587,552 | B1 | 7/2003 | Zimmerman |
| 6,597,775 | B2 | 7/2003 | Lawyer et al. |
| 6,915,259 | B2 * | 7/2005 | Rigazio ............ G10L 15/07 704/E15.011 |
| 7,006,605 | B1 | 2/2006 | Morganstein et al. |
| 7,039,951 | B1 | 5/2006 | Chaudhari et al. |
| 7,054,811 | B2 | 5/2006 | Barzilay |
| 7,106,843 | B1 | 9/2006 | Gainsboro et al. |
| 7,158,622 | B2 | 1/2007 | Lawyer et al. |
| 7,212,613 | B2 | 5/2007 | Kim et al. |
| 7,299,177 | B2 | 11/2007 | Broman et al. |
| 7,386,105 | B2 | 6/2008 | Wasserblat et al. |
| 7,403,922 | B1 | 7/2008 | Lewis et al. |
| 7,539,290 | B2 | 5/2009 | Ortel |
| 7,657,431 | B2 | 2/2010 | Hayakawa |
| 7,660,715 | B1 * | 2/2010 | Thambiratnam ....... G10L 15/22 704/244 |
| 7,668,769 | B2 | 2/2010 | Baker et al. |
| 7,693,965 | B2 | 4/2010 | Rhoads |
| 7,778,832 | B2 | 8/2010 | Broman et al. |
| 7,822,605 | B2 | 10/2010 | Zigel et al. |
| 7,908,645 | B2 | 3/2011 | Varghese et al. |
| 7,940,897 | B2 | 5/2011 | Khor et al. |
| 8,036,892 | B2 | 10/2011 | Broman et al. |
| 8,073,691 | B2 | 12/2011 | Rajakumar |
| 8,112,278 | B2 | 2/2012 | Burke |
| 8,311,826 | B2 | 11/2012 | Rajakumar |
| 8,510,215 | B2 | 8/2013 | Gutierrez |
| 8,537,978 | B2 | 9/2013 | Jaiswal et al. |
| 9,001,976 | B2 * | 4/2015 | Arrowood .......... G10L 15/07 379/907 |
| 10,113,440 | B2 | 11/2018 | Ziv et al. |
| 10,438,592 | B2 * | 10/2019 | Ziv ............ G10L 17/00 |
| 10,650,826 | B2 * | 5/2020 | Ziv ............ G10L 17/02 |
| 11,227,603 | B2 * | 1/2022 | Ziv ............ G10L 17/02 |
| 2001/0026632 | A1 | 10/2001 | Tamai |
| 2002/0022474 | A1 | 2/2002 | Blom et al. |
| 2002/0099649 | A1 | 7/2002 | Lee et al. |
| 2003/0009333 | A1 | 1/2003 | Sharma et al. |
| 2003/0050780 | A1 * | 3/2003 | Rigazio ............ G10L 21/0208 704/E15.011 |
| 2003/0050816 | A1 | 3/2003 | Givens et al. |
| 2003/0097593 | A1 | 5/2003 | Sawa et al. |
| 2003/0147516 | A1 | 8/2003 | Lawyer et al. |
| 2003/0208684 | A1 | 11/2003 | Camacho et al. |
| 2004/0029087 | A1 | 2/2004 | White |
| 2004/0111305 | A1 | 6/2004 | Gavan et al. |
| 2004/0131160 | A1 | 7/2004 | Mardirossian |
| 2004/0143635 | A1 | 7/2004 | Galea |
| 2004/0167964 | A1 | 8/2004 | Rounthwaite et al. |
| 2004/0203575 | A1 | 10/2004 | Chin et al. |
| 2004/0240631 | A1 | 12/2004 | Broman et al. |
| 2005/0010411 | A1 * | 1/2005 | Rigazio ............ G10L 15/26 704/E15.045 |
| 2005/0043014 | A1 | 2/2005 | Hodge |
| 2005/0076084 | A1 | 4/2005 | Loughmiller et al. |
| 2005/0125226 | A1 | 6/2005 | Magee |
| 2005/0125339 | A1 | 6/2005 | Tidwell et al. |
| 2005/0135595 | A1 | 6/2005 | Bushey et al. |
| 2005/0185779 | A1 | 8/2005 | Toms |
| 2006/0013372 | A1 | 1/2006 | Russell |
| 2006/0098803 | A1 | 5/2006 | Bushey et al. |
| 2006/0106605 | A1 | 5/2006 | Saunders et al. |
| 2006/0149558 | A1 * | 7/2006 | Kahn ............ G10L 15/063 704/278 |
| 2006/0161435 | A1 | 7/2006 | Atef et al. |
| 2006/0212407 | A1 | 9/2006 | Lyon |
| 2006/0212925 | A1 | 9/2006 | Shull et al. |
| 2006/0248019 | A1 | 11/2006 | Rajakumar |
| 2006/0251226 | A1 | 11/2006 | Hogan et al. |
| 2006/0282660 | A1 | 12/2006 | Varghese et al. |
| 2006/0285665 | A1 | 12/2006 | Wasserblat et al. |
| 2006/0289622 | A1 | 12/2006 | Khor et al. |
| 2006/0293891 | A1 | 12/2006 | Pathuel |
| 2007/0041517 | A1 | 2/2007 | Clarke et al. |
| 2007/0071206 | A1 | 3/2007 | Gainsboro et al. |
| 2007/0074021 | A1 | 3/2007 | Smithies et al. |
| 2007/0100608 | A1 | 5/2007 | Gable et al. |
| 2007/0124246 | A1 | 5/2007 | Lawyer et al. |
| 2007/0244702 | A1 | 10/2007 | Kahn et al. |
| 2007/0250318 | A1 | 10/2007 | Waserblat et al. |
| 2007/0280436 | A1 | 12/2007 | Rajakumar |
| 2007/0282605 | A1 | 12/2007 | Rajakumar |
| 2007/0288242 | A1 * | 12/2007 | Spengler ............ G10L 15/20 704/E15.04 |
| 2008/0010066 | A1 | 1/2008 | Broman et al. |
| 2008/0181417 | A1 * | 7/2008 | Pereg ............ G10L 17/00 704/E11.001 |
| 2008/0195387 | A1 | 8/2008 | Zigel et al. |
| 2008/0222734 | A1 | 9/2008 | Redlich et al. |
| 2009/0046841 | A1 | 2/2009 | Hodge |
| 2009/0103708 | A1 * | 4/2009 | Conway ............ H04M 3/42221 379/265.06 |
| 2009/0119106 | A1 | 5/2009 | Rajakumar |
| 2009/0147939 | A1 | 6/2009 | Morganstein et al. |
| 2009/0247131 | A1 | 10/2009 | Champion et al. |
| 2009/0254971 | A1 | 10/2009 | Herz et al. |
| 2009/0319269 | A1 | 12/2009 | Aronowitz |
| 2010/0138282 | A1 | 6/2010 | Kannan et al. |
| 2010/0228656 | A1 | 9/2010 | Wasserblat et al. |
| 2010/0303211 | A1 | 12/2010 | Hartig |
| 2010/0305946 | A1 | 12/2010 | Gutierrez |
| 2010/0305960 | A1 | 12/2010 | Gutierrez |
| 2010/0332287 | A1 * | 12/2010 | Gates ............ G06Q 30/02 379/265.09 |
| 2011/0004472 | A1 | 1/2011 | Zlokarnik |
| 2011/0026689 | A1 | 2/2011 | Metz et al. |
| 2011/0119060 | A1 | 5/2011 | Aronowitz |
| 2011/0191106 | A1 | 8/2011 | Khor et al. |
| 2011/0255676 | A1 | 10/2011 | Marchand et al. |
| 2011/0282661 | A1 | 11/2011 | Dobry et al. |
| 2011/0282778 | A1 | 11/2011 | Wright et al. |
| 2011/0320484 | A1 | 12/2011 | Smithies et al. |
| 2012/0053939 | A9 | 3/2012 | Gutierrez et al. |
| 2012/0054202 | A1 | 3/2012 | Rajakumar |
| 2012/0072453 | A1 | 3/2012 | Guerra et al. |
| 2012/0130771 | A1 * | 5/2012 | Kannan ............ G06Q 30/0203 707/738 |
| 2012/0253805 | A1 | 10/2012 | Rajakumar et al. |
| 2012/0254243 | A1 | 10/2012 | Zeppenfeld et al. |
| 2012/0263285 | A1 | 10/2012 | Rajakumar et al. |
| 2012/0284026 | A1 | 11/2012 | Cardillo et al. |
| 2013/0163737 | A1 | 6/2013 | Dement et al. |
| 2013/0197912 | A1 | 8/2013 | Hayakawa et al. |

(56) References Cited

U.S. PATENT DOCUMENTS

| | | |
|---|---|---|
| 2013/0253919 A1 | 9/2013 | Gutierrez et al. |
| 2013/0300939 A1 | 11/2013 | Chou et al. |
| 2014/0067394 A1 | 3/2014 | Abuzeina |
| 2014/0142940 A1 | 5/2014 | Ziv et al. |
| 2015/0055763 A1 | 2/2015 | Guerra et al. |
| 2016/0364606 A1 | 12/2016 | Conway et al. |
| 2016/0379032 A1 | 12/2016 | Mo et al. |
| 2016/0379082 A1 | 12/2016 | Rodriguez et al. |

FOREIGN PATENT DOCUMENTS

| | | |
|---|---|---|
| JP | 2006038955 | 9/2006 |
| WO | 2000077772 | 12/2000 |
| WO | 2004079501 | 9/2004 |
| WO | 2006013555 | 2/2006 |
| WO | 2007001452 | 1/2007 |

OTHER PUBLICATIONS

Cheng, Y., "Mean Shift, Mode Seeking, and Clustering," IEEE Transactions on Pattern Analysis and Machine Intelligence, vol. 17, No. 8, 1995, pp. 790-799.

Cohen, I., "Noise Spectrum Estimation in Adverse Environment: Improved Minima Controlled Recursive Averaging," IEEE Transactions On Speech and Audio Processing, vol. 11, No. 5, 2003, pp. 466-475.

Cohen, I., et al., "Spectral Enhancement by Tracking Speech Presence Probability in Subbands," Proc. International Workshop in Hand-Free Speech Communication (HSC'01), 2001, pp. 95-98.

Coifman, R.R., et al., "Diffusion maps," Applied and Computational Harmonic Analysis, vol. 21, 2006, pp. 5-30.

Hayes, M.H., "Statistical Digital Signal Processing and Modeling," J. Wiley & Sons, Inc., New York, 1996, 200 pages.

Hermansky, H., "Perceptual linear predictive (PLP) analysis of speech," Journal of the Acoustical Society of America, vol. 87, No. 4, 1990, pp. 1738-1752.

Lailler, C., et al., "Semi-Supervised and Unsupervised Data Extraction Targeting Speakers: From Speaker Roles to Fame?," Proceedings of the First Workshop on Speech, Language and Audio in Multimedia (SLAM), Marseille, France, 2013, 6 pages.

Mermelstein, P., "Distance Measures for Speech Recognition—Psychological and Instrumental," Pattern Recognition and Artificial Intelligence, 1976, pp. 374-388.

Schmalenstroeer, J., et al., "Online Diarization of Streaming Audio-Visual Data for Smart Environments," IEEE Journal of Selected Topics in Signal Processing, vol. 4, No. 5, 2010, 12 pages.

Viterbi, A.J., "Error Bounds for Convolutional Codes and an Asymptotically Optimum Decoding Algorithm," IEEE Transactions on Information Theory, vol. 13, No. 2, 1967, pp. 260-269.

* cited by examiner

SYSTEM AND METHOD OF VIDEO CAPTURE AND SEARCH OPTIMIZATION FOR CREATING AN ACOUSTIC VOICEPRINT

CROSS-REFERENCE TO RELATED APPLICATIONS

The present application is a continuation of U.S. patent application Ser. No. 16/848,385, filed on Apr. 14, 2020, which application is a continuation of U.S. patent application Ser. No. 16/594,812, filed on Oct. 7, 2019, which application is a continuation of U.S. patent application Ser. No. 16/170,306, filed on Oct. 25, 2018, which application is a continuation of U.S. patent application Ser. No. 14/084,974, filed on Nov. 20, 2013, which application claims priority of U.S. Provisional Patent Application Nos. 61/729,064, filed on Nov. 21, 2012, and 61/729,067 filed Nov. 21, 2012, the contents of which are incorporated herein by reference in their entireties.

BACKGROUND

The present disclosure is related to the field of automated transcription. More specifically, the present disclosure is related to diarization using acoustic labeling.

Speech transcription and speech analytics of audio data may be enhanced by a process of diarization wherein audio data that contains multiple speakers is separated into segments of audio data typically to a single speaker. While speaker separation in diarization facilitates later transcription and/or speech analytics, further identification or discrimination between the identified speakers can further facilitate these processes by enabling the association of further context and information in later transcription and speech analytics processes specific to an identified speaker.

Systems and methods as disclosed herein present solutions to improve diarization using acoustic models to identify and label at least one speaker separated from the audio data. Previous attempts to create individualized acoustic voiceprint models are time intensive in that an identified speaker must recorded training speech into the system or the underlying data must be manually separated to ensure that only speech from the identified speak is used. Recorded training speech further has limitation as the speakers are likely to speak differently than when the speaker is in the middle of a live interaction with another person.

BRIEF DISCLOSURE

An embodiment of a method of diarization of audio files includes receiving speaker metadata associated with each of a plurality of audio files. A set of audio files of the plurality belonging to a specific speaker are identified based upon the received speaker metadata. A sub set of the audio files of the identified set of audio files is selected. An acoustic voiceprint for the specific speaker is computed from the selected subset of audio files. The acoustic voiceprint is applied to a new audio file to identify a specific speaker in the diarization of the new audio file.

An exemplary embodiment of a method of diarization of audio files of a customer service interaction between at least one agent and at least one customer includes receiving agent metadata associated with each of a plurality of audio files. A set of audio files of the plurality of audio files associated to a specific agent is identified based upon the received agent metadata. A subset of the audio files of the identified set of audio files are selected that maximize an acoustical difference between audio data of an agent and audio data of at least one other speaker in each of the audio files. An acoustic voiceprint is computed from the audio data of the agent in the selected subset. The acoustic voiceprint is applied to a new audio file to identify the agent in diarization of the new audio file.

An exemplary embodiment of a system for diarization of audio data includes a database of audio files, each audio file of the database being associated with metadata identifying at least one speaker in the audio file. A processor is communicatively connected to the database. The processor selects a set of audio files with the same speaker based upon the metadata. The processor fitters the selected set to a subset of the audio files that maximize an acoustical difference between audio data of at least two speakers in an audio file. The processor creates an acoustic voiceprint for the speaker identified by the metadata. A database includes a plurality of acoustic voiceprints, each acoustic voiceprint of the plurality is associated with a speaker. An audio source provides new audio data to the processor with metadata that identified at least one speaker in the audio data. The processor selects an acoustic voiceprint from the plurality of acoustic voiceprints based upon the metadata and applies the selected acoustic voiceprint to the new audio data to identify audio data of the speaker in the new audio data for diarization of the new audio data.

DETAILED DISCLOSURE

Embodiments of a diarization process disclosed herein include a first optional step of a speech-to-text transcription of an audio file to be diarized. Next, a "blind" diarization of the audio file is performed. The audio file is exemplarily a .WAV file. The blind diarization receives the audio file and optionally the automatically generated transcript. This diarization is characterized as "blind" as the diarization is performed prior to an identification of the speakers. In an exemplary embodiment of a customer service call, the "blind diarization" may only cluster the audio data into speakers while it may still be undetermined which speaker is the agent and which speaker is the customer.

The blind diarization is followed by a speaker diarization wherein a voiceprint model that represents the speech and/or information content of an identified speaker in the audio data is compared to the identified speech segments associated with the separated speakers. Through this comparison, one speaker can be selected as the known speaker, while the other speaker is identified as the other speaker. In an exemplary embodiment of customer service interactions, the customer agent will have a voiceprint model as disclosed herein which is used to identify one of the separated speaker as the agent while the other speaker is the customer.

The identification of segments in an audio file, such as an audio stream or recording (e.g. a telephone call that contains speech) can facilitate increased accuracy in transcription, diarization, speaker adaption, and/or speech analytics of the audio file. An initial transcription, exemplarily from a fast speech-to-text engine, can be used to more accurately identify speech segments in an audio file, such as an audio stream or recording, resulting in more accurate diarization and/or speech adaptation.

Figure 1:
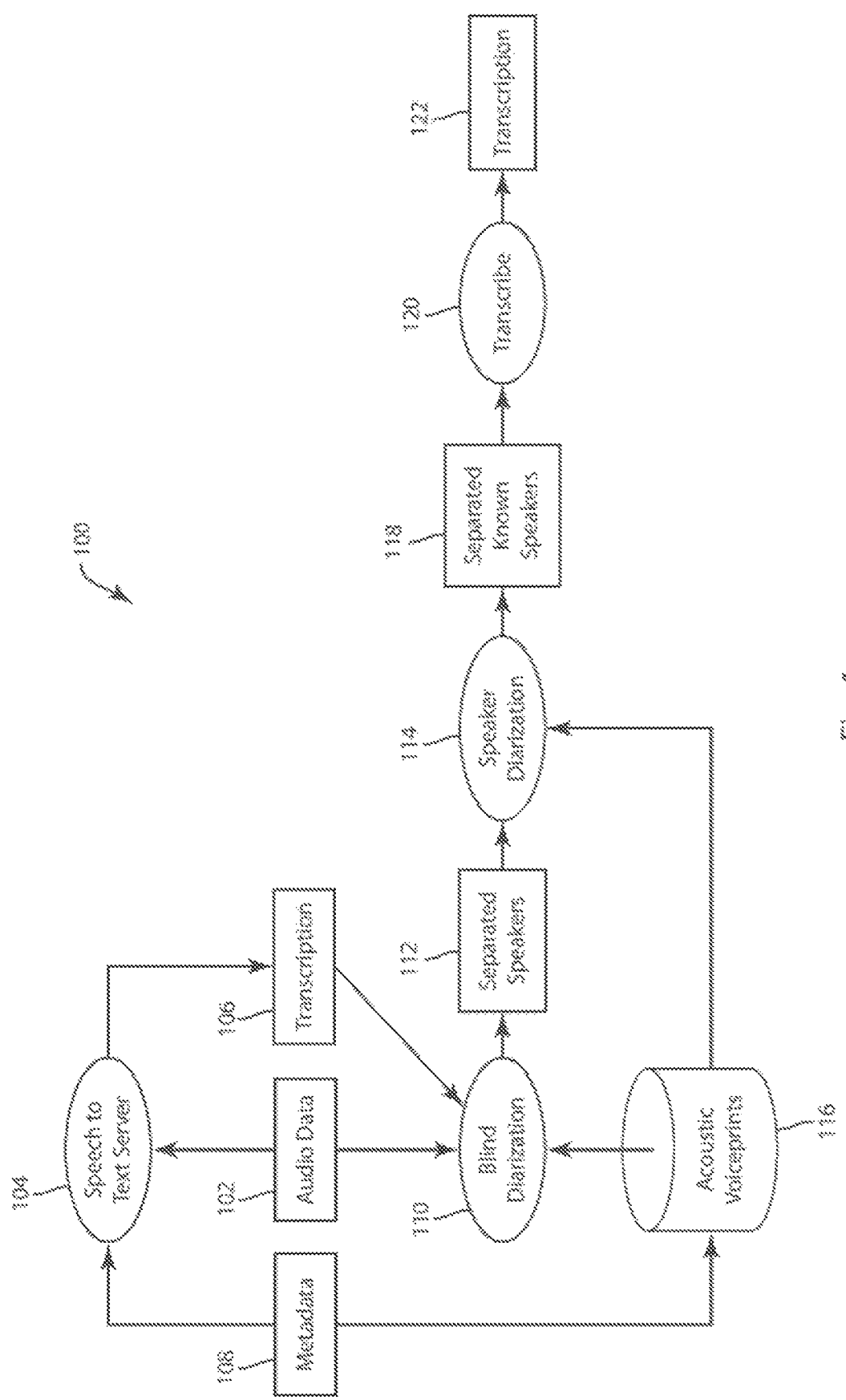
FIG. 1 is a flow chart that depicts an embodiment of a method of diarization.
Figure 2:
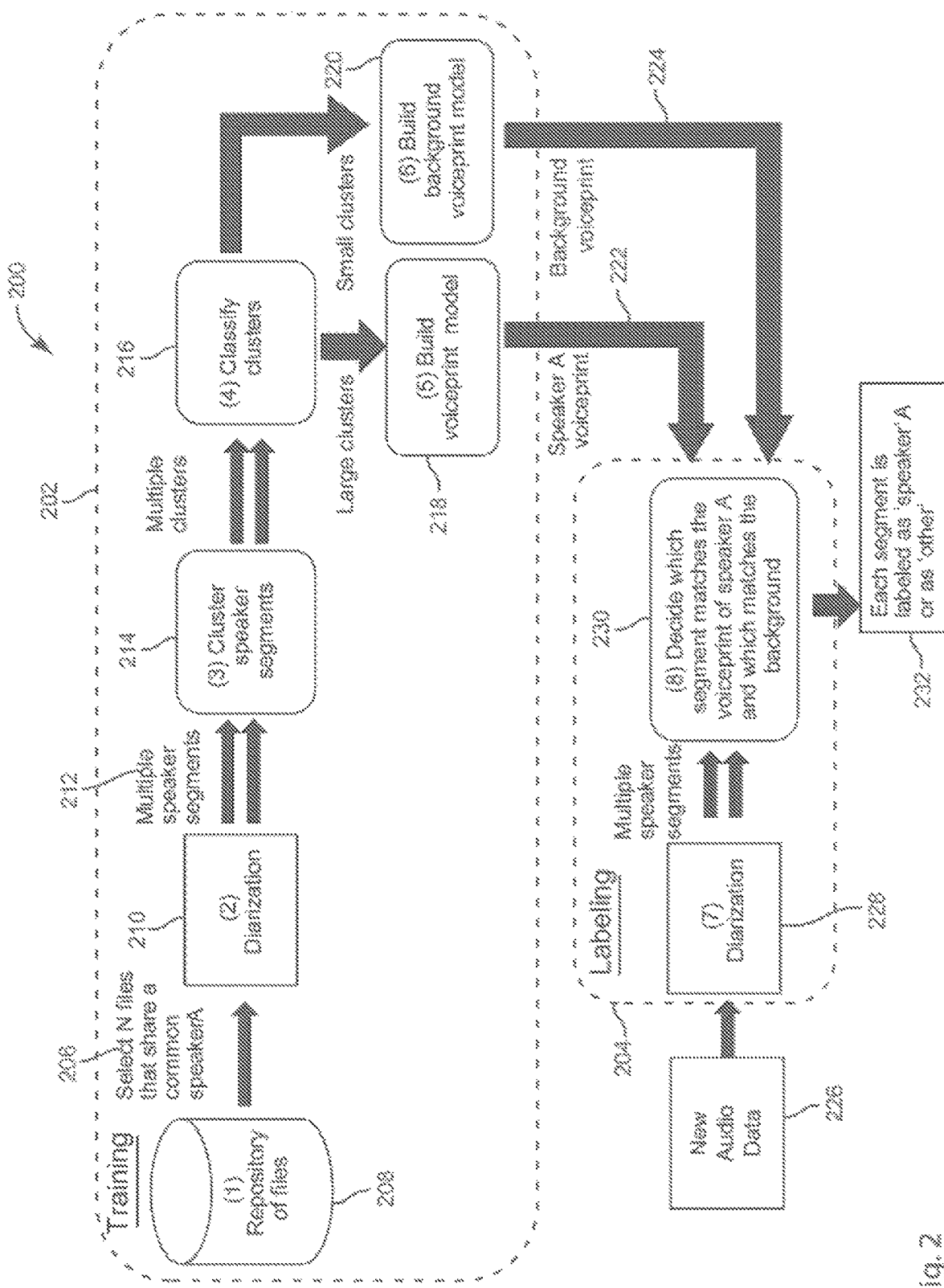
FIG. 2 is a flow chart that depicts an embodiment of creating and using an acoustic voiceprint model.
Figure 3:
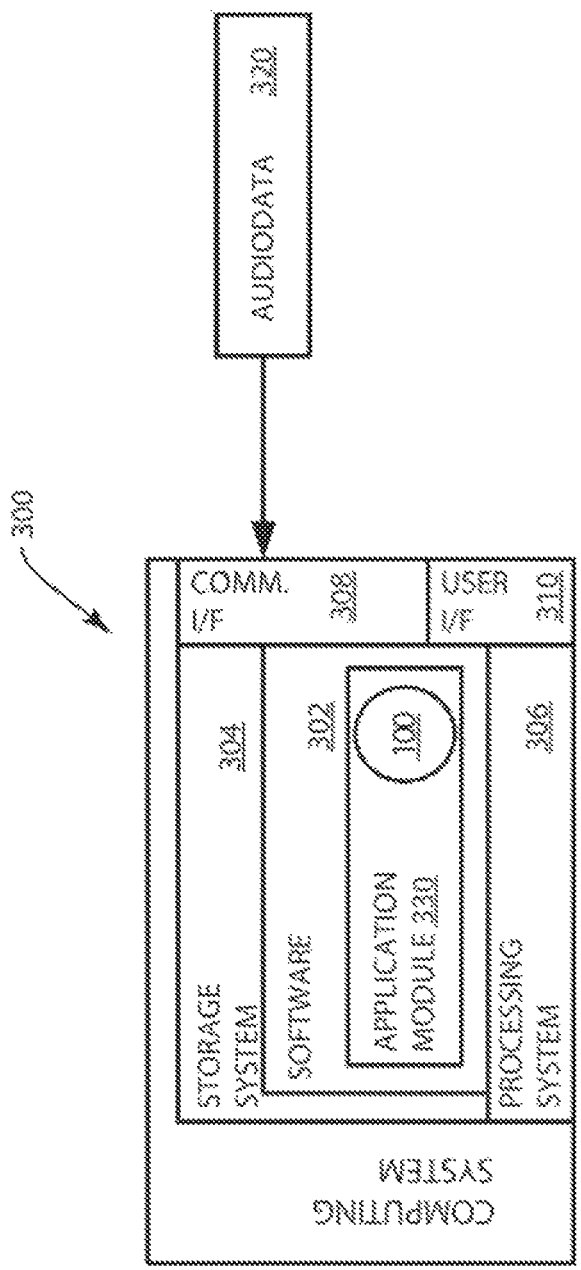
FIG. 3 is a system diagram of an exemplary embodiment of a system for diarization of audio files.

FIGS. 1 and 2 are flow charts that respectively depict exemplary embodiments of method 100 of diarization and a method 200 of creating and using an acoustic voiceprint model. FIG. 3 is a system diagram of an exemplary embodiment of a system 300 for creating and using an acoustic voiceprint model. The system 300 is generally a computing system that includes a processing system 306, storage system 304, software 302, communication interface 308 and a user interface 310. The processing system 306 loads and executes software 302 from the storage system 304, including a software module 330. When executed by the computing system 300, software module 330 directs the processing system 306 to operate as described in herein in further detail in accordance with the method 100 and alternatively the method 200.

Although the computing system 300 as depicted in FIG. 3 includes one software module in the present example, it should be understood that one or more modules could provide the same operation. Similarly, while description as provided herein refers to a computing system 300 and a processing system 306, it is to be recognized that implementations of such systems can be performed using one or more processors, which may be communicatively connected, and such implementations are considered to be within the scope of the description.

The processing system 306 can comprise a microprocessor and other circuitry that retrieves and executes software 302 from storage system 304. Processing system 306 can be implemented within a single processing device but can also be distributed across multiple processing devices or sub-systems that cooperate in existing program instructions. Examples of processing system 306 include general purpose central processing units, application specific processors, and logic devices, as well as any other type of processing device, combinations of processing devices, or variations thereof.

The storage system 304 can comprise any storage media readable by processing system 306, and capable of storing software 302. The storage system 304 can include volatile and non-volatile, removable and non-removable media implemented in any method or technology for storage of information, such as computer readable instructions, data structures, program modules, or other data. Storage system 304 can be implemented as a single storage device but may also be implemented across multiple storage devices or sub-systems. Storage system 304 can further include additional elements, such as a controller capable of communicating with the processing system 306.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to storage the desired information and that may be accessed by an instruction execution system, as well as any combination or variation thereof, or any other type of storage medium. In some implementations, the storage media can be a non-transitory storage media. In some implementations, at least a portion of the storage media may be transitory. It should be understood that in no case is the storage media a propagated signal.

User interface 310 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display an interface further associated with embodiments of the system and method as disclosed herein. Speakers, printers, haptic devices and other types of output devices may also be included in the user interface 310.

As described in further detail herein, the computing system 200 receives an audio file 320. The audio file 320 may be an audio recording or a conversation, which may exemplarily be between two speakers, although the audio recording may be any of a variety of other audio records, including multiple speakers, a single speaker, or an automated or recorded auditory message. In still further embodiments, the audio file may be streaming audio data received in real time or near-real time by the computing system 300.

FIG. 1 is a flow chart that depicts an embodiment of a method of diarization 100. Audio data 102 is exemplarily an audio recording of a conversation exemplarily between two or more speakers. The audio file may exemplarily be a .WAV file, but may also be other types of audio or video files, for example, pulse code modulated (PCM) formatted audio, and more specifically, linear pulse code modulated (LPCM) audio files. Furthermore, the audio data is exemplarily a mono audio file; however, it is recognized that embodiments of the method disclosed herein may also be used with stereo audio files. One feature of the method disclosed herein is that speaker separation and diarization can be achieved in mono audio files where stereo speaker separation techniques are not available.

In embodiments, the audio data 102 further comprises or is associated to metadata 108. The metadata 108 can exemplarily include an identification number for one or more of the speakers in the audio data 102. In alternative embodiments, the metadata 108 may provide information regarding context or content of the audio data 102, including a topic, time, date, location etc. In the context of a customer service call center, the metadata 108 provides a customer service agent identification.

In an embodiment, the audio data 102 and the metadata 108 are provided to a speech-to-text (STT) server 104, which may employ any of a variety of method of techniques for automatic speech recognition (ASR) to create an automated speech-to-text transcription 106 from the audio file. The transcription performed by the STT server at 104 can exemplarily be a large-vocabulary continuous speech recognition (LVCSR) and the audio data 102 provided to the STT server 104 can alternatively be a previously recorded audio file or can be streaming audio data obtained from an ongoing communication between two speakers. In an exemplary embodiment, the STT server 104 may use the received metadata 108 to select one or more models or techniques for producing the automated transcription cased upon the metadata 108. In a non-limiting example, an identification of one of the speakers in the audio data can be used to select a topical linguistic model based upon a context area associate with the speaker. In addition to the transcription 106 from the SIT server 104. STT server 104 may also output time stamps associate with particular transcription segments, words, or phrases, and may also include a confidence score in the automated transcription. The transcription 106 may also identify homogeneous speaker speech segments. Homogenous speech segments are those segments of the transcription that have a high likelihood of originating from a single speaker. The speech segments may exemplarily be phonemes, words, or sentences.

After the transcription 106 is created, both the audio data 102 and the transcription 106 are used for a blind diarization at 110. However, it is to be recognized that in alternative embodiments, the blind diarization may be performed without the transcription 106 and may be applied directly to the audio data 102. In such embodiments, the features at 104 and 106 as described above may not be used. The diarization is characterized as blind as the identities of the speakers (e.g. agent, customer) are not known at this stage and therefore the diarization 110 merely discriminates between a first speaker (speaker 1) and a second speaker (speaker 2), or more. Additionally, in some embodiments, those segments for which a speaker cannot be reliably determined may be labeled as being of an unknown speaker.

An embodiment of the blind diarization at 110 receives the mono audio data 102 and the transcription 106 and begins with the assumption that there are two main speakers in the audio file. The homogeneous speaker segments from 106 are identified in the audio file. Then, long homogeneous speaker segments can be split into sub-segments if long silent intervals are found within a single segment. The sub-segments are selected to avoid splitting the long speaker segments within a word. The transcription information in the information file 106 can provide context to where individual words start and end. After the audio file has been segmented based upon both the audio file 102 and the information file 106, the identified segments are clustered into speakers (e.g. speaker 1 and speaker 2).

In an embodiment, the blind diarization uses voice activity detection (VAD) to segment the audio data 102 into utterances or short segments of audio data with a likelihood of emanating from a single speaker. In an embodiment, the VAD segments the audio data into utterances by identifying segments of speech separated by segments of non-speech on a frame-by-frame basis. Context provided by the transcription 106 can improve the distinction between speech and not speech segments. In the VAD at 304 an audio frame may be identified as speech or non-speech based upon a plurality of characteristics or probabilities exemplarily based upon mean energy, band energy, peakiness, or residual energy; however, it will be recognized that alternative characteristics or probabilities may be used in alternative embodiments.

Embodiments of the blind diarization 110 may further leverage the received metadata 108 to select an acoustic voiceprint model 116, from a plurality of stored acoustic voiceprint models as well be described in further detail herein. Embodiments that use the acoustic voiceprint model in the blind diarization 110 can improve the clustering of the segmented audio data into speakers, for example by helping to cluster segments that are otherwise indeterminate, or "unknown."

The blind diarization at 110 results in audio data of separated speaker at 112. In an example, the homogeneous speaker segments in the audio data are tagged as being associated with a first speaker or a second speaker. As mentioned above, in some embodiments, in determinate segments may be tagged as "unknown" and audio data may have more than two speakers tagged.

At 114 a second diarization, "speaker" diarization, is undertaken to identify which of the first speaker and second speaker is the speaker identified by the metadata 108 and which speaker is the at least one other speaker. In the exemplary embodiment of a customer service interaction, the metadata 108 identifies a customer service agent participating in the recorded conversation and the other speaker is identified as the customer. An acoustic voiceprint model 116, which can be derived in a variety of manners or techniques as described in more detail herein, is compared to the homogeneous speaker audio data segments assigned to the first speaker and then compared to the homogeneous speaker audio data segments assigned to the second speaker to determine which separated speaker audio data segments have a greater likelihood of matching the acoustic voiceprint model 116. At 118, the homogeneous speaker segments tagged in the audio file as being the speaker that is most likely the agent based upon the comparison of the acoustic voiceprint model 116 are tagged as the speaker identified in the metadata and the other homogeneous speaker segments are tagged as being the other speaker.

At 120, the diarized and labeled audio data from 118 again undergoes an automated transcription, exemplarily performed by a STT server or other form of ASR, which exemplarily may be LVCSR. With the additional context of both enhanced identification of speaker segments and clustering and labeling of the speaker in the audio data, an automated transcription 122 can be output from the transcription at 120 through the application of improved algorithms and selection of further linguistic or acoustic models tailored to either the identified agent or the customer, or another aspect of the customer service interaction as identified through the identification of one or more of the speakers in the audio data. This improved labeling of the speaker in the audio data and the resulting transcription 122 can also facilitate analytics of the spoken content of the audio data by providing additional context regarding the speaker, as well as improved transcription of the audio data.

It is to be noted that in some embodiments, the acoustic voice prints as described herein may be used in conjunction with one or more linguistic models, exemplarily the linguistic models as disclosed and applied in U.S. Provisional Patent Application No. 61/729,067, which is incorporated herein by reference. In such combined embodiments, the speaker diarization may be performed in parallel with both a linguistic model and an acoustic voice print model and the two resulting speaker diarization are combined or analyzed in combination in order to provide an improved separation of the audio data into known speakers. In an exemplary embodiment, if both models agree on a speaker label, then that label is used, while if the analysis disagrees, then an evaluation may be made to determine which model is the more reliable or more likely model based upon the context of the audio data. Such an exemplary embodiment may offer the advantages of both acoustic and linguistic modeling and speaker separation techniques.

In a still further embodiment, the combination of both an acoustic voiceprint model and a linguistic model can help to identify errors in the blind diarization or the speaker separation phases, exemplarily by highlighting the portions of the audio data above within which the two models disagree and providing for more detailed analysis on those areas in which the models are in disagreement in order to arrive at the correct diarization and speaker labeling. Similarly, the use of an additional linguistic model may provide a backup for an instance wherein an acoustic voiceprint is not available or identified based upon the received metadata. For example, this situation may arrive when there is insufficient audio data regarding a speaker to create an acoustic voiceprint as described in further detail herein.

Alternatively, in embodiments, even if the metadata does not identify a speaker, if an acoustic voiceprint exists for a speaker in the audio data, all of the available acoustic voiceprints may be compared to the audio data in order to identify at least one of the speakers in the audio data. In a still further embodiment, a combined implantation using a linguistic model and an acoustic model may help to identify an incongruity between the received metadata, which may identify one speaker, while the comparison to that speaker's acoustic voiceprint model reveals that the identified speaker is not in the audio data. In one non-limiting example, in the context of a customer service interaction, this may help to detect an instance wherein a customer service agent enters the wrong agent ID number so that corrective action may be taken. Finally, in still further embodiments the use of a combination of acoustic and linguistic models may help in the identification and separation of speakers in audio data that contain more than two speakers, exemplarily, one customer service agent and two customers; two agents and one customer; or an agent, a customer, and an automated recording such as a voicemail message.

FIG. 2 is a flow chart that depicts an embodiment of the creation and use of an acoustic voiceprint model exemplarily used as the acoustic voiceprint model 116 in FIG. 1. Referring back to FIG. 2, the method 200 is divided into two portions, exemplarily, the creation of the acoustic voiceprint model at 202 and the application or use of the acoustic voiceprint model at 204 to label speakers in an audio file. In an exemplary embodiment of a customer service interaction, the acoustic voiceprint model is of a customer service agent and associated with an agent identification number specific to the customer service agent.

Referring specifically to the features at 202, at 206 a number (N) of files are selected from a repository of files 208. The files selected at 206 all share a common speaker, exemplarily, the customer service agent for which the model is being created. In an embodiment, in order to make this selection, each of the audio files in the repository 208 are stored with or associated to an agent identification number. In exemplary embodiments, N may be 5 files, 100 files, or 1,000; however, these are merely exemplary numbers. In an embodiment, the N files selected at 20 may be further filtered in order to only select audio files in which the speaker, and thus the identified speaker are easy to differentiate, for example due to the frequency of the voices of the different speakers. By selecting only those files in which the acoustic differences between the speakers are maximized, the acoustic voiceprint model as disclosed herein may be started with files that are likely to be accurate in the speaker separation. In one embodiment, the top 50% of the selected files are used to create the acoustic voiceprint, while in other embodiments, the top 20% or top 10% are used; however, these percentages are in no way intended to be limiting on the thresholds that may be used in embodiments in accordance with the present disclosure.

In a still further embodiment, a diarization or transcription of the audio file is received and scored and only the highest scoring audio files are used to create the acoustic voiceprint model. In an embodiment, the score may exemplarily be an automatedly calculated confidence score for the diarization or transcription. Such automated confidence may exemplarily, but not limited to, use an auto correction function.

Each of the files selected at 206 are processed through a diarization at 210. The diarization process may be such as is exemplarily disclosed above with respect to FIG. 1. In an embodiment, the diarization at 210 takes each of the selected audio files and separates the file into a plurality of segments of speech separated by non-speech. In an embodiment, the plurality of speech segments are further divided such that each segment has a high likelihood of containing speech sections from a single speaker. Similar to the blind diarization described above, the diarization at 210 can divide the audio file into segments labeled as a first speaker and a second speaker (or in some embodiments more speakers) at 212.

At 214 the previously identified speaker segments from the plurality of selected audio files are clustered into segments that are similar to one another. The clustering process can be done directly by matching segments based upon similarity to one another or by clustering the speaker segments based upon similarities to a group of segments. The clustered speaker segments are classified at 216. Embodiments of the system and method use one or more metrics to determine which clusters of speaker segments belong to the customer service agent and which speaker segment clusters belong to the customers with whom the customer service agent was speaking. In one non-limiting embodiment, the metric of cluster size may be used to identify the segment clusters associated with the customer service agent as larger clusters may belong to the customer service agent because the customer service agent is a party in each of the audio files selected for use in creating a model at 206. While it will be recognized that other features related to the agent's script, delivery, other factors related to the customer service calls themselves may be used as the classifying metric.

At 218 an acoustic voiceprint model for the identified speaker, exemplarily a customer service agent is built using the segments that have been classified as being from the identified speaker. At 220 a background voiceprint model that is representative of the audio produced from speakers who are not the identified speaker is built from those speech segments identified to not be the identified speaker, and thus may include the other speakers as well as background noise.

Therefore, in some embodiments, the acoustic voiceprint model, such as exemplarily used with respect to FIG. 1 described above, includes both an identified speaker voiceprint 222 that is representative of the speech of the identified speaker and a background voiceprint 224 that is representative of the other speaker with whom the identified speaker speaks, and any background noises to the audio data of the identified speaker.

It will be recognized that in embodiments, the creation of the acoustic voiceprint model 202 may be performed in embodiments to create an acoustic voiceprint model for each of a plurality of identified speakers that will be recorded and analyzed in the diarization method of FIG. 1. Exemplarily in these embodiments, the identified speakers may be a plurality of customer service agents. In some embodiments, each of the created acoustic voiceprint models are stored in a database of acoustic voiceprint models from which specific models are accessed as described above with respect to FIG. 1, exemplarily based upon an identification number in metadata associated with audio data.

In further embodiments, the processes at 202 may be performed at regular intervals using a predefined number of recently obtained audio data, or a stored set of exemplary audio files. Such exemplary audio files may be identified from situations in which the identified speaker is particularly easy to pick out in the audio, perhaps due to differences in the pitch or tone between the identified speaker's voice and the other speaker's voice, or due to a distinctive speech pattern or characteristic or prevalent accent by the other speaker. In still other embodiments, the acoustic voiceprint model is built on an ad hoc basis at the time of diarization of the audio. In such an example, the acoustic model creation process may simply select a predetermined number of the most recent audio recordings that include the identified speaker or may include all audio recordings within a predefined date that include the identified speaker. It will be also noted that once the audio file currently being processed has been diarized, that audio recording may be added to the repository of audio files 208 for training of future models of the speech of the identified speaker.

204 represents an embodiment of the use of the acoustic voiceprint model as created at 202 in performing a speaker diarization, such as represented at 114 in FIG. 1. Referring back to FIG. 2, at 226 new audio data is received. The new audio data received at 226 may be a stream of real-time audio data or may be recorded audio data being processed. Similar to that described above with respect to 110 and 112 in FIG. 1, the new audio data 226 undergoes diarization at 228 to separate the new audio data 226 into segments that can be confidently tagged as being the speech of a single speaker, exemplarily a first speaker and a second speaker. At 230 the selected acoustic voiceprint 222 which may include background voiceprint 224, is compared to the segments identified in the diarization at 228. In one embodiment, each of the identified segments is separately compared to both the acoustic voiceprint 222 and to the background voiceprint 224 and an aggregation of the similarities of the first speaker segments and the second speaker segments to each of the models is compared in order to determine which of the speakers in the diarized audio file is the identified speaker.

In some embodiments, the acoustic voiceprint model is created from a collection of audio files that are selected to provide a sufficient amount of audio data that can be confidently tagged to belong only to the agent, and these selected audio files are used to create the agent acoustic model. Some considerations that may go into such a selection may be identified files with good speaker separation and sufficient length to provide data to the model and confirm speaker separation. In some embodiments, the audio files are preprocessed to eliminate non-speech data from the audio file that may affect the background model. Such elimination of non-speech data can be performed by filtering or concatenation.

In an embodiment, the speakers in an audio file can be represented by a feature vector and the feature vectors can be aggregated into clusters. Such aggregation of the feature vectors may help to identify the customer service agent from the background speech as the feature vector associated with the agent will aggregate into clusters more quickly than those feature vectors representing a number of different customers. In a still further embodiment, an iterative process may be employed whereby a first acoustic voiceprint model is created using some of the techniques disclosed above, the acoustic voiceprint model is tested or verified, and if the model is not deemed to be broad enough or be based upon enough speaker segments, additional audio files and speaker segments can be selected from the repository and the model is recreated.

In one non-limiting example, the speaker in an audio file is represented by a feature vector. An initial super-segment labeling is performed using agglomerative clustering of feature vectors. The feature vectors from the agent will aggregate into clusters more quickly than the feature vectors from the second speaker as the second speaker in each of the audio files is likely to be a different person. A first acoustic voiceprint model is built from the feature vectors found in the largest clusters and the background model is built from all of the other feature vectors. In one embodiment, a diagonal Gaussian can be trained fix each large cluster from the super-segments in that cluster. However, other embodiments may use Gaussian Mixture Model (GMM) while still further embodiments may include i-vectors. The Gaussian& are then merged where a weighting value of each Gaussian is proportionate to the number of super-segments in the cluster represented by the Gaussian. The background model can be comprised of a single diagonal Gaussian trained on the values of the super segments that are remaining.

Next, the acoustic voiceprint model can be refined by calculating a log-likelihood of each audio file's super-segments with both the acoustic voiceprint and background models, reassigning the super-segments based upon this comparison. The acoustic voiceprint and background models can be rebuilt from the reassigned super-segments in the manner as described above and the models can be iteratively created in the manner described above until the acoustic voiceprint model can be verified.

The acoustic voiceprint model can be verified when a high enough quality match is found between enough of the sample agent super-segments and the agent model. Once the acoustic voiceprint model has been verified, then the final acoustic voiceprint model can be built with a single full Gaussian over the last super-segment assignments from the application of the acoustic voiceprint model to the selected audio files. As noted above, alternative embodiments may use Gaussian Mixture Model (GMM) while still further embodiments may use i-vectors. The background model can be created from the super-segments not assigned to the identified speaker. It will be recognized that in alternative embodiments, an institution, such as a call center, may use a single background model for all agents with the background model being updated in the manner described above at periodic intervals.

Embodiments of the method described above can be performed or implemented in a variety of ways. The SST server, in addition to performing the LVCSR, can also perform the diarization process. Another alternative is to use a centralized server to perform the diarization process. In one embodiment, a stand-alone SST server performs the diarization process locally without any connection to another server for central storage or processing. In an alternative embodiment, the STT server performs the diarization, but relies upon centrally stored or processed models, to perform the initial transcription. In a still further embodiment, a central dedicated diarization server may be used where the output of many STT servers are sent to the centralized diarization server for processing. The centralized diarization server may have locally stored models that build from processing of all of the diarization at a single server.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for creating a background acoustic voiceprint, the method comprising:
   receiving, by a processor, a plurality of audio files from an audio database server;
   diarizing, by the processor, each of the plurality of audio files by:
      separating the audio file into a plurality of speaker segments, wherein each speaker segment is a segment of speech separated by non-speech;
      clustering each of the speaker segments for the audio file into groups of similar speaker segments, wherein each group of similar speaker segments has a high likelihood of containing speech from a single speaker; and
classifying each of the clustered groups of speaker segments as belonging to agents or as belonging to an other speaker, wherein the other speaker is not an agent;
generating, by the processor, the background acoustic voiceprint based on the clustered speaker segments classified as belonging to the other speaker;
receiving, by the processor, a new audio file;
separating the new audio file into a new plurality of speaker segments, wherein each new speaker segment is a segment of speech separated by non-speech;
applying, by the processor, the background acoustic voiceprint to each new speaker segment for the new audio file to determine which new speaker segments match the acoustic voiceprint; and
labeling, by the processor, each new speaker segments of the new audio file that de does not match the acoustic voiceprint as belonging to an agent.

2. The method of claim 1, further comprising
clustering each of the new plurality of speaker segments for the new audio file into groups of similar speaker segments; and
classifying each group of speaker segments as belonging to a first speaker audio file or a second speaker audio file,
wherein the acoustic voiceprint is applied to the first speaker audio file and the second speaker audio file to determine if one of the speaker audio files is the other speaker.

3. The method of claim 1, further comprising providing a diarization system for creating and applying acoustic voiceprints to audio data.

4. The method of claim 3, wherein the diarization system includes the audio database server, a voiceprint database server, the processor, and an audio source.

5. The method of claim 4, wherein the processor is operably connected to the audio database server and the voiceprint database server.

6. The method of claim 4, wherein the audio source is operably connected to the audio database server, wherein the audio data stored in the audio database server was generated from the audio source.

7. The method of claim 4, further comprising saving the acoustic voiceprint to the voiceprint database server.

8. A system for creating a background acoustic voiceprint, the system comprising:
an audio database server including a plurality of audio files;
a processor; and
a memory storing instructions, which when executed by the processor causes the processor to:
receive a plurality of audio files from the audio database server;
diarize each of the plurality of audio files by:
separate the audio file into a plurality of speaker segments, wherein each speaker segment is a segment of speech separated by non-speech;
cluster each of the speaker segments for the audio filed into groups of similar speaker segments, wherein each group of similar speaker segments has high likelihood of containing speech from a single speaker; and
classify each of the clustered groups of speaker segments as belonging to agents or as belonging to an other speaker, wherein the other speaker is not an agent;
generate the background acoustic voiceprint based on the clustered speaker segments classified as belonging to the other speaker;
receive a new audio file;
separate the new audio file into a new plurality of speaker segments, wherein each new speaker segment is a segment of speech separated by non-speech;
apply the background acoustic voiceprint to each new speaker segment for the new audio file to determine which new speaker segments match the acoustic voiceprint; and
label each new speaker segments of the new audio file that do not match the acoustic voiceprint as belonging to an agent.

9. The system of claim 8, wherein the processor is further instructed to:
cluster each of the new plurality of speaker segments for the new audio file into groups of similar speaker segments; and
classify each group of speaker segments as belonging to a first speaker audio file or a second speaker audio file
wherein the acoustic voiceprint is applied to the first speaker audio file and the second speaker audio file to determine if one of the speaker audio files is the other speaker.

10. The system of claim 8, the system comprising a diarization system for creating and applying acoustic voiceprints to audio data.

11. The system of claim 10, wherein the diarization system includes the audio database server, a voiceprint database server, the processor, the memory, and an audio source.

12. The system of claim 11, wherein the processor is operably connected to the audio database server and the voiceprint database server.

13. The system of claim 11, wherein the audio source is operably connected to the audio database server, wherein the audio data stored in the audio database server was generated from the audio source.

14. The system of claim 11, wherein the processor is further instructed to save the acoustic voiceprint to the voiceprint database server.

15. A non-transitory computer-readable medium having instructions stored thereon for facilitating diarization of audio files, wherein the instructions, when executed by a processing system, direct the processing system to:
receive a plurality of audio files from the audio database server;
diarize each of the plurality of audio files by:
separate the audio file into a plurality of speaker segments, wherein each speaker segment is a segment of speech separated by non-speech;
cluster each of the speaker segments for the audio file into groups of similar speaker segments, wherein each group of similar speaker segments has a high likelihood of containing speech from a single speaker; and
classify each of the clustered groups of speaker segments as belonging to agents or as belonging to an other speaker, wherein the other speaker is not an agent;

build a background acoustic voiceprint based on the clustered speaker segments classified as belonging to the other speaker;
receive a new audio file;
separate the new audio file into a new plurality of speaker segments, wherein each new speaker segment is a segment of speech separated by non-speech;
apply the background acoustic voiceprint to each new speaker segment for the new audio file to determine which new speaker segments match the acoustic voiceprint; and
label each new speaker segments of the new audio file that does not match the acoustic voiceprint as belonging to an agent.

16. The non-transitory computer-readable medium of claim 15, wherein the non-transitory computer-readable medium is provided within a diarization system for creating and applying acoustic voiceprints to audio data.

17. The non-transitory computer-readable medium of claim 16, wherein the diarization system includes the audio database server, a voiceprint database server, the processor, and an audio source.

18. The non-transitory computer-readable medium of claim 17, wherein the processor is operably connected to the audio database server and the voiceprint database server.

19. The non-transitory computer-readable medium of claim 17, wherein the audio source is operably connected to the audio database server, wherein the audio data stored in the audio database server was generated from the audio source.

20. The non-transitory computer-readable medium of claim 17, wherein the processing system is further instructed to save the acoustic voiceprint to the voiceprint database server.

* * * * *